Figure 1:
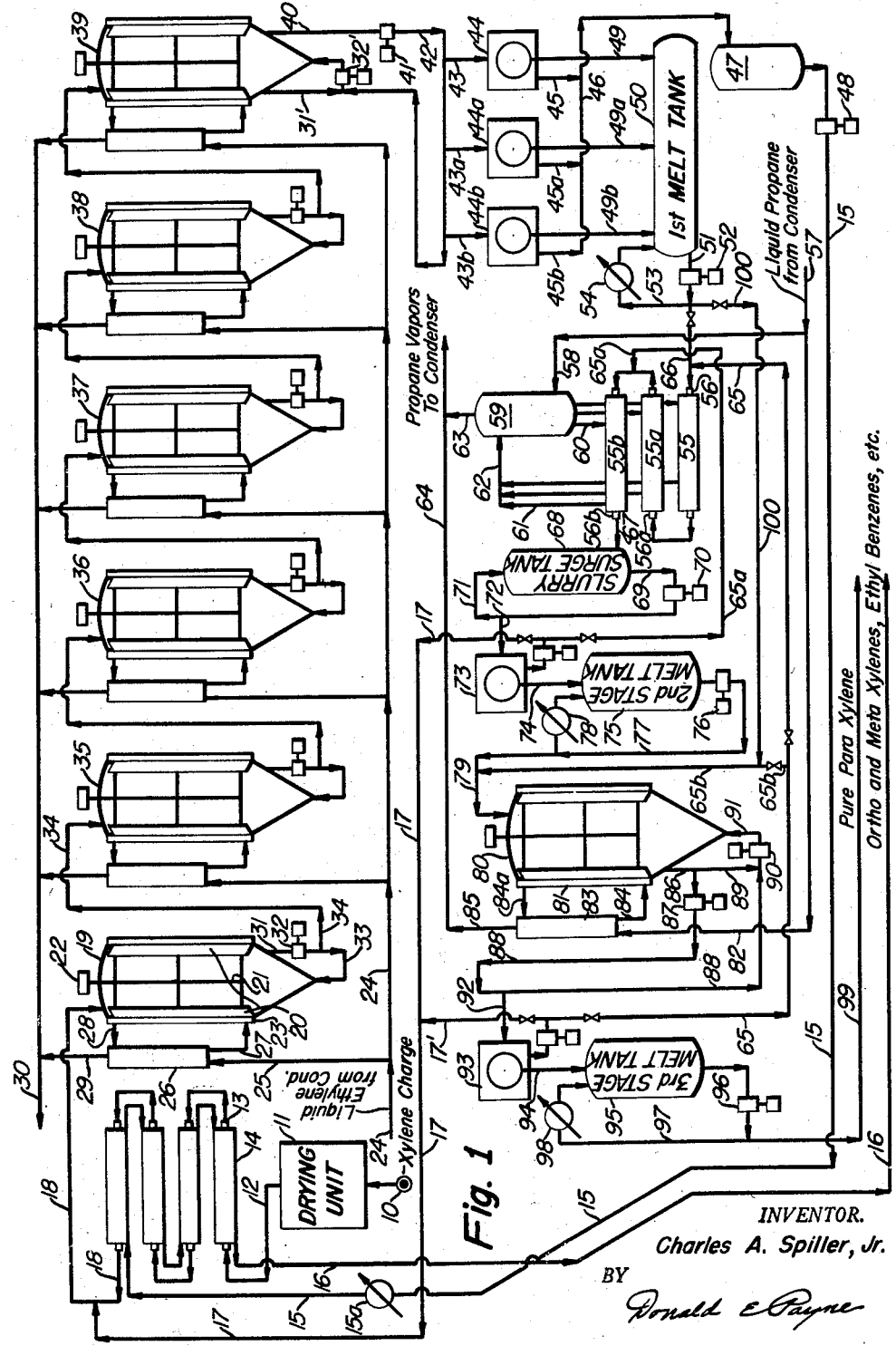

INVENTOR.
Charles A. Spiller, Jr.
BY
Donald E. Payne
ATTORNEY

Dec. 30, 1958

C. A. SPILLER, JR 2,866,833

PARAXYLENE PURIFICATION SYSTEM

Filed Sept. 14, 1953

2 Sheets-Sheet 2

INVENTOR.
Charles A. Spiller, Jr.
BY
*Donald E. Payne*
ATTORNEY

United States Patent Office 2,866,833
Patented Dec. 30, 1958

2,866,833
PARAXYLENE PURIFICATION SYSTEM

Charles A. Spiller, Jr., Chicago, Ill., assignor to Standard Oil Company, Chicago, Ill., a corporation of Indiana Application September 14, 1953, Serial No. 379,776

3 Claims. (Cl. 260—674)

This invention relates to an improved paraxylene purification system and it pertains more particularly to an improved method and means for obtaining large yields of substantially pure paraxylene from a hydrocarbon charging stock containing appreciable amounts of other xylene isomers, ethyl benzene and paraffinic hydrocarbons.

It has long been known that paraxylene could be separated from its isomers by crystallization in customary double walled stirring vessels at temperatures which are dependent on the composition of the charge and that the paraxylene thus obtained can be purified by recrystallization (U. S. 1,940,065). Various eutectics are formed between paraxylene and other components of a xylene charge (Kravchenko, J. Phys. Chem., U. S. S. R., 15, 652–8, 1941; Acta Physicochemica, U. S. S. R., 20, 567–77, 1945). The temperature at which paraxylene and various eutectics solidify is dependent to a considerable extent on the amount and nature of other hydrocarbons or diluents which may be present in the charging stock but simple routine cooling tests on any particular charge are sufficient for determining the temperature to which an initial charge should be cooled in order to obtain the crystallization of paraxylene without appreciable amounts of eutectics or other components. In purification by recrystallization higher temperatures must be employed in the recrystallization step and in order to obtain paraxylene of high purity a large amount of filtrate from the recrystallization step has heretofore had to be recycled to the initial recrystallizing step which greatly increased the refrigeration load and the filtration or centrifuge capacity required in a commercial plant. An object of this invention is to provide an improved multistage paraxylene purification system which, in conjunction with the crystallization procedure employed in the first stage, enables the production of maximum yields of paraxylene of 98–99 percent purity with minimum capital investment and operating costs. Other objects will be apparent as the detailed description of the invention proceeds.

In accordance with this invention a three-stage purification system is employed which minimizes the amount of chilling and centrifuge capacity required for obtaining a given yield of 98–99 percent paraxylene. When a two-stage process is employed for obtaining paraxylene of such purity, the first centrifuge cake will usually have a solids content of approximately 80 weight percent and the second stage centrifuge cake may have a solids content in the range of about 90 to 95 weight percent. For obtaining paraxylene of a given purity the temperature required in the second step is dependent on the dryness of the cake which can be obtained, higher temperatures necessarily resulting in greater amounts of paraxylene in the second stage filtrate. Thus for obtaining 98.3 percent paraxylene from a given charge, the second stage crystallization temperature and percent paraxylene in the second filtrate for various second stage cake solids contents are as follows:

| Solids Content of 2nd Stage Cake | 2nd Stage Crystallization Temperature, ° F. | Percent Paraxylene in 2nd Stage Filtrate |
|---|---|---|
| 90 | 36 | 83.0 |
| 93 | 30 | 75.7 |
| 95 | 21 | 66.0 |

As paraxylene purity increases, the paraxylene concentration of the second stage filtrate also increases. The higher the concentration of paraxylene in the filtrate, the greater will be the required recycle to the first stage in a two-stage process and the consequent rate of first stage cake production. There is a practical limit on paraxylene purity obtainable in a two-stage system as will be seen from the following tabulation which is based on 93 weight percent solids in the second stage cake. For comparison the corresponding values for the three-stage system, which are based on 93 percent solids for the second and third stage cake, are also shown.

| Purity of Product | Pounds Recycled to 1st Stage Per Pound of Product | | 1st Stage Cake Production Per Pound of Product | |
|---|---|---|---|---|
| | Two-Stage | Three-Stage | Two-Stage | Three-Stage |
| 96.0 | 0.38 | 0.36 | 1.38 | 1.36 |
| 96.5 | 0.49 | 0.37 | 1.49 | 1.37 |
| 97.0 | 0.67 | 0.38 | 1.67 | 1.38 |
| 97.5 | 0.97 | 0.40 | 1.97 | 1.40 |
| 98.0 | 1.77 | 0.41 | 2.77 | 1.41 |
| 98.3 | 3.18 | 0.42 | 4.18 | 1.42 |
| 98.5 | 6.93 | 0.42 | 7.93 | 1.42 |
| 99.0 | (*) | 0.43 | (*) | 1.43 |
| 99.5 | (*) | 0.44 | (*) | 1.44 |

*Cannot be obtained.

A two-stage system for obtaining 98.5 percent purity would thus require about 16 times as much filtrate recycle and about 6 times the first stage centrifuge capacity as would be required with a three-stage system. In accordance with the present invention a product paraxylene purity of 98.3 percent can be obtained with only about 1.42 pounds of first stage cake per pound of product. The added third stage requires only mild refrigeration and since the centrifuge load in the second and third stages is substantially less than that in the first stage, the net result is that the three-stage system will only require about half the number of centrifuges that would be required in a two-stage system and at the same time effect substantial savings in refrigeration costs.

For obtaining paraxylene product of highest purity, the three-stage system may be operated by melting the cake from the first stage, recrystallizing the first melt with most of the filtrate from the second stage and a portion of the filtrate from the third stage, melting the cake from the second stage, re-recrystallizing the second melt with a portion of the filtrate from the third stage and melting the third cake, a relatively small amount of second filtrate being recycled to the first chilling stage and the first filtrate being employed to cool refrigerant and then precool incoming charge. However, for obtaining maximum throughput in a given plant and at the same time obtaining a paraxylene product purity of at least about 98 to 99 percent purity, the first stage melt is combined with the second stage melt and charged to the third stage chiller and separation system from which final product is obtained, the filtrate from the third stage being crystallized in the second stage together with most of filtrate from the second stage and a relatively small amount of the filtrate from the second stage is returned to the first stage chiller. In either case it is important to employ proper chilling conditions and procedures particularly in the first stage.

Figure 2:
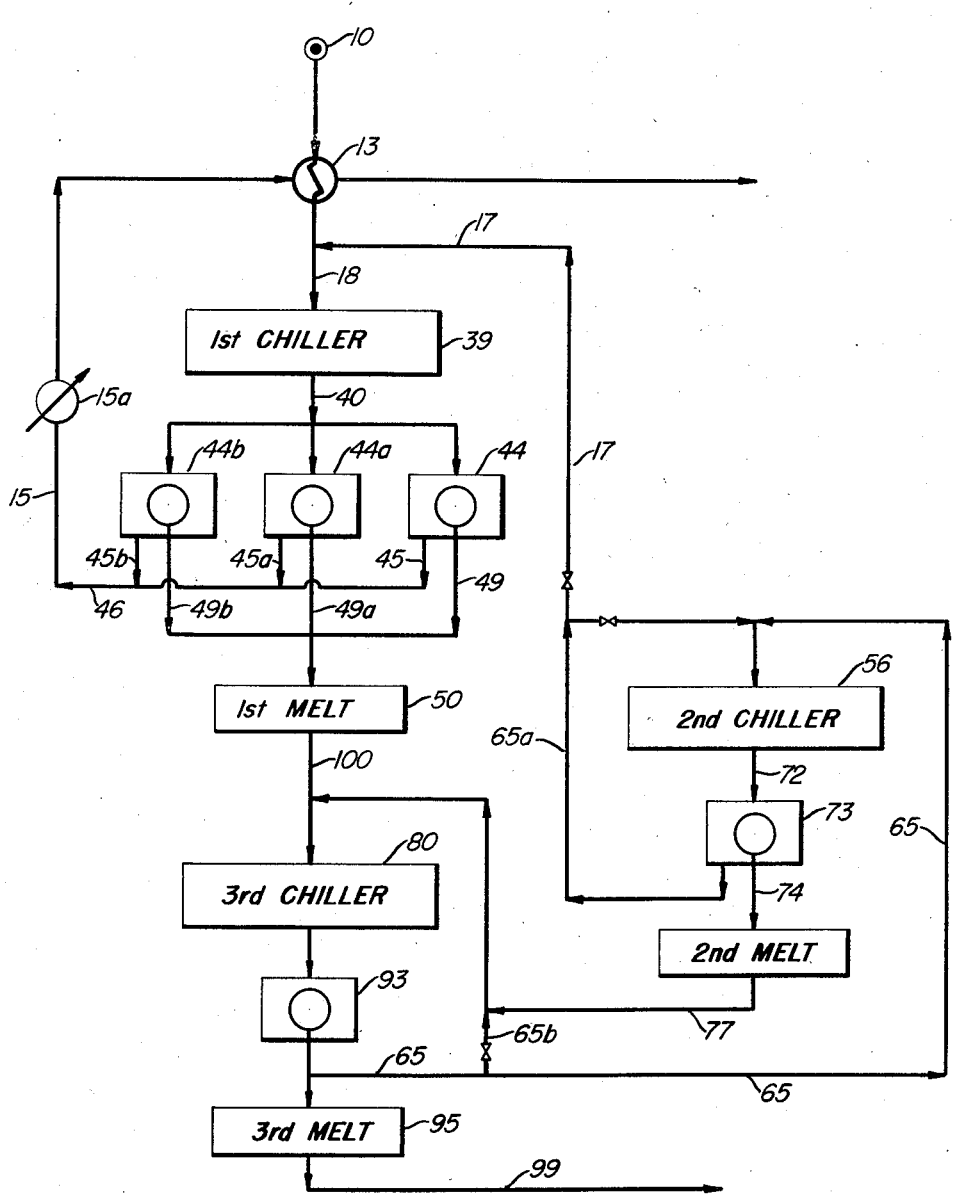

The invention will be more clearly understood from the following detailed description of preferred examples thereof read in conjunction with the accompanying drawings which form a part of this specification and in which:

Figure 1 is a schematic flow diagram of a commercial plant for obtaining 2,220 pounds per hour (16.5 MM pounds per year) of paraxylene of 98.3 percent purity from a charging stock containing 13.12 weight percent paraxylene, and Figure 2 is a simplified flowsheet illustrating the operation of the plant for obtaining maximum throughput.

The charging stock in this example is a $C_8$ hydrocarbon fraction boiling in the range of about 260 to 320° F. and obtained by hydroforming of naphtha followed by extractive distillation. Preferred ranges of charging stock compositions are approximately as follows:

| Component | Range, Volume (percent) | Example |
| --- | --- | --- |
| Paraxylene | 8–25 | 13 |
| Metaxylene | 15–50 | 33 |
| Orthoxylene | 5–30 | 17 |
| Ethyl benzene, toluene, etc | 5–40 | 23 |
| Paraffinic Hydrocarbons | 1–20 | 10 |

Such charging stock from source 10 is introduced into a drying unit 11 which is preferably of the adsorption type employing any well known adsorbent such as alumina. The dried product passes through line 12 to heat exchange tubes 13 in indirect heat exchange relationship with mother liquor in surrounding pipes 14, said cold mother liquor, after chilling liquid ethylene in heat exchanger 15a, being introduced by line 15 and withdrawn from the system by line 16. The charge thus cooled to about —50° F. is supplemented by about 922 pounds per hour of impure paraxylene introduced at about —5° F. through line 17 and the combined stream is introduced by line 18 to the top of first chilling vessel 19.

Chilling vessel 19 is about 11 to 12 feet in diameter and 15 to 20 feet high and it is surrounded by a cooling jacket in which liquid ethylene is boiled to abstract heat from the contents of the vessel. In order that high heat transfer coefficient may be obtained, the vessel walls are scraped by scrapers 20 which are mounted on central shaft 21 and driven by any suitable mechanism 22. A relatively rapid rate of scraping is preferred since, in view of the size of the vessel and the fact that the vessel constantly contains crystal nuclei, it is important to keep the vessel surfaces clean and the vessel contents well agitated.

Cooling of vessel 19 is effected by boiling ethylene in jacket 23 which surrounds the vessel. The ethylene is supplied from a condenser (not shown) to manifold 24 from which it is introduced by line 25 into surge vessel 26. Liquid ethylene from the base of the surge vessel is introduced by line 27 into jacket 23 and vapors from the top of jacket 23 are returned by line 28 to surge vessel 26. Ethylene vapors from 26 pass by line 29 and manifold 30 back to the compressor and condenser which are not shown but which form a part of the refrigeration system.

Ample crystal nuclei are maintained in the vessel and there is a constant classification of the crystals therein so that the larger crystal particles may be constantly withdrawn. In order to obtain such classification and likewise to supplement the scraper action in maintaining agitation, about 400 gallons per minute of slurry is withdrawn from the bottom outer periphery of vessel 19 by line 31 and pump 32 most of which is returned by line 33 for upward injection at the center of the base of the vessel. The internal recycle rate is preferably about 4 to 10 times the charge rate to the vessel and in this example is approximately 6 times said charge rate. The upflowing slurry in the vessel not only agitates the contents thereof but it promotes a classification of crystals since the smaller crystals tend to remain in the upper part of the vessel while the larger crystals tend to pass downward for withdrawal through line 31. By this method of operation the introduced charge crystallizes largely on nuclei which are already formed and the formation of new nuclei is thus restricted so that crystals of large particle size are ultimately attainable. The average temperature in vessel 19 may be about —75° F. and of the 28,083 pounds per hour of slurry which is transferred by line 34 to second vessel 35, about 895 pounds per hour constitute paraxylene crystals.

Vessel 35 is of the same size and construction and operates in the same manner as vessel 19 except that the average temperature maintained therein will be approximately —91 or —92° F. The same is true of the succeeding vessels in the first stage, the average temperature of the slurry in vessel 36 being about —104° F., in vessel 37 being about —112 to —113° F., in vessel 38 being about —118° F. and in vessel 39 being about —121 to —125° F. The jackets in all of the vessels are maintained at a temperature of about —130° F. although it should be understood, of course, that by controlling the pressure of the boiling ethylene a still lower temperature might be obtained in the last vessel or two of the system. In this example the ethylene refrigerant is introduced at —80° F. under a pressure of about 367 p. s. i. a. and ethylene vapors are removed at —130° F. at a pressure of approximately 30 p. s. i. a., but the refrigerant may be at other temperatures or pressures.

The amount of solids in the slurry, of course, increases from vessel to vessel, the slurry leaving vessel 35 containing about 1,805 pounds per hour, leaving vessel 36 being 2,255 pounds per hour, leaving vessel 37 being 2,485 pounds per hour and leaving vessel 38 being 2,600 pounds per hour. The final slurry is withdrawn from vessel 39 through line 40 by pump 41 and charged by return manifold 42 through branch lines 43, 43a and 43b to a battery of centrifuges 44, 44a and 44b. Line 42 returns to vessel 39 by pump 32' any slurry which is not introduced to centrifuges. The centrifuges are preferably operated at a temperature below —120° F., preferably about —121 to —125° F. The centrifuged liquid, commonly called first filtrate or mother liquor, is withdrawn by lines 45, 45a and 45b through line 46 to surge tank 47 from which it is passed by pump 48 and line 15 for cooling refrigerant and incoming charge as hereinabove described.

The paraxylene crystals from the centrifuges, without any washing step, are introduced by lines 49, 49a and 49b to first stage melt tank 50 which is maintained at about +50° F. by recycling liquid therefrom through line 51, pump 52, line 53 and melt heater 54 and thence back to tank 50.

The second stage chiller in this example is of the ordinary scraped surface tubular type in which refrigerant is circulated in the annulus between outer tubes 55 and inner tubes 56, the latter being provided with suitable scrapers. In this case the refrigerant is liquid propane which is received from a condenser through manifold 57 and introduced through line 58 to surge drum 59. Liquid propane is introduced from the base of this surge drum through line 60 to the annular space between tubes 55 and 56 and propane vapors are returned by lines 61 and 62 to surge drum 59. Vapors leave the surge drum through line 63 and manifold 64 to a suitable propane condenser and compressor (not shown). In this case the propane liquid is introduced at +26° F. at 61 p. s. i. a. and propane vapors leave at —20° F. and about 25 p. s. i. a., but here again other temperatures and pressures may be employed.

When operating the three-stage system to obtain highest paraxylene product purity, about 3,142 pounds per hour of melted product from the first stage is introduced by line 66 together with 280 pounds per hour of recycled filtrate from the third stage through line 65 to scraped surface exchanger 56 and when this liquid is partially chilled, about 5,878 pounds per hour of recycled filtrate from the second stage is introduced by line 65a, the total mixture being chilled to a temperature in the range of 20 to −30° F., e. g. about −10° F. Here the method and rate of chilling is not of such critical importance as in the first stage although it should be understood that chillers of the type employed in the first stage may likewise be employed in the second stage. The chilled slurry is introduced from scraped surface exchanger 56b through line 67 to slurry surge tank 68 from which about 25 percent slurry is circulated through line 69 by pump 70 and line 71. About 2,325 pounds per hour of slurried solids is withdrawn through line 72 to the second stage centrifuge 73 which, in this example, operates at about −10° F. to give a cake containing about 93 percent solids. The second filtrate is withdrawn through line 65a for recycle as hereinabove described, a portion thereof being returned by line 17 for admixture with incoming charge as hereinabove described. A second stage filtrate surge tank (not shown) may be employed ahead of the pump which discharges the filtrate into line 17 and line 65a.

The centrifuged cake from centrifuge 73 is withdrawn through line 74 to second stage melt tank 75 which is maintained at about 65° F. by circulating liquid by pump 76 through line 77 and heater 78 back to tank 75. About 2,500 pounds per hour of the melted xylene of about 95 to 96 percent purity is withdrawn from the circulating stream through line 79 and introduced at the top of the third stage crystallizer 80 together with about 5,758 pounds per hour of third stage filtrate from line 65b. This crystallizer may be of the same size and design as crystallizers employed in the first stage and may be provided with internal scraping blades. Cooling in this case is effected by boiling propane in jacket 81, the propane being introduced from header 57 through line 82 to surge tank 83 from which liquid propane is introduced to the jacket by line 84 and propane vapors returned by line 84a. Vapors leave the top of the surge tank by line 85 and header 64. In this case the liquid propane is introduced at 26° F. and 61 p. s. i. a. and vapors are withdrawn through header 64 at −20° F. and 25.4 p. s. i. a. The slurry in crystallizer 80 may be at a temperature of about +30° F. Slurry is withdrawn from the outer lower periphery of vessel 80 by line 86 and pumped by pump 87 to line 88 for charging the third stage centrifuge, any return slurry together with slurry withdrawn through line 89 is recycled by pump 90 through line 91 at the bottom mid point of the vessel, pump 90 returning slurry at the rate of about 400 gallons per minute to effect classification as in the case of first stage chillers.

A 25 percent slurry containing about 2,065 pounds per hour of solids is charged by line 92 to third stage centrifuge 93 which operates at about 30° F. Most of the filtrate from the third stage is returned through line 65 and line 65b for recycle in the third stage, the rest being returned to the second stage as hereinabove described. Here again a filtrate surge tank (not shown) may be employed ahead of the pump which returns the filtrate either through line 65 or through line 17' to line 17.

The cake from the third centrifuge is introduced by line 94 to third stage melt tank 95 which is maintained at about 90° F. by circulating melted product by pump 96 through line 97 and heat exchanger 98 back to tank 95. The net paraxylene product is withdrawn through line 99 and, in this case, constitutes about 2.220 pounds per hour of paraxylene of approximately 98.3 percent purity.

The same product purity may be obtained with even less load on the second and third stage centrifuges and less refrigeration therein by employing the apparatus hereinabove described in the manner illustrated in Figure 2 wherein the reference characters correspond to similar elements in Figure 1. In this mode of operation about 922 pounds per hour of 39.6 percent paraxylene is returned by line 17 from the second stage and introduced together with incoming charging stock through line 18 to the first chilling system which operates as hereinabove described down to the collection of the first melted cake in tank 59. The 3,142 pounds per hour of melted cake, instead of being introduced by line 66 to chiller 56, is introduced directly by line 100 to third chiller 80 together with 1,653 pounds per hour of melted cake from the second stage melt tank 75 through line 77. About 3,465 pounds per hour of third filtrate containing 75.7 percent paraxylene is recycled through line 65b. The remaining third stage filtrate is returned by line 65 to second chiller 56 at the rate of about 2,575 pounds per hour of a composition containing about 75.7 percent paraxylene at a temperature of approximately 35° F. About 3,575 pounds per hour of second filtrate containing 39.6 percent paraxylene is recycled to the second chiller along with the third filtrate, the rest of the second filtrate being returned to the first stage through line 17 as hereinabove described. The second and third stage separation steps in this example may be at the same temperatures as hereinabove described, namely −10° F. and +30° F., respectively. The final product from melt tank 95 is withdrawn through line 99 and constitutes about 2,220 pounds per hour of paraxylene of 98.3 percent purity.

The procedures first described may be termed "double recrystallization" while the scheme illustrated in Figure 2 may be termed "filtrate recrystallization." Both schemes result in the same refrigeration load and centrifuge load in the first stage. However, the rate of cake removal in the second stage (assuming 93 percent solids in second and third stage cakes) is 2,500 pounds per hour in a double recrystallization scheme and only 1,653 pounds per hour in the filtrate scheme of Figure 2 for producing a product of 98.3 percent purity. From the standpoint of refrigeration requirements (still on the basis of 93 percent second and third cake solids content and 98.3 percent product purity) the double recrystallization scheme requires 34.5 tons of propane refrigeration while the filtrate scheme of Figure 2 requires only 27.9 tons of propane refrigeration. It will thus be seen that for making a product purity of 98.3 percent, the filtrate system of Figure 2 effects a marked saving in centrifuge capacity and a marked saving in refrigeration costs. When it is desired to obtain product purities of about 99 percent or higher the double recrystallization scheme is advantageous.

From the foregoing description it will be seen that the paraxylene purification process of this invention is very flexible and the system may be operated in any manner best suited for any particular charging stock. Provision may be made for returning filtrate from the third stage directly to the incoming charging stock entering the first stage by lines 17' and 17 although ordinarily this is undesirable. In either of the schemes hereinabove disclosed a relatively small amount of filtrate is returned from the second stage to the first stage chillers which makes possible enormous savings in chilling costs and centrifuge capacity.

In the example hereinabove disclosed the chilling time in the first stage is about 18 to 20 hours so that the average chilling rate is of the order of 3 to 5° per hour. The chilling is not effected at a uniform rate, however, in that the slurry which is introduced into each of the vessels in the first stage is shocked chilled to the temperature of the slurry in that vessel. In view of the size of the vessels and the fact that the holding time in each vessel is about 3 hours or more, the usual effects of shock chilling are not obtained but, on the contrary, the crystals grow larger and larger in the succeeding stages.

An advantage of this chilling system is the fact that it may utilize conventional scraped surface chilling vessels of the type commonly employed in the art for other purposes and with scraping rates of the same order as those conventionally employed. The method and conditions employed in the first chilling stage are important from the standpoint of obtaining large readily filterable crystals. It should be understood that no invention is claimed in the chilling step per se and that alternative methods of chilling, such as the so-called Oslo crystallizer or conventional double pipe chillers, may be used provided that they are operated to obtain large readily filterable crystals.

The expression "filtrate" as hereinabove employed refers to liquid separated in centrifugal separators as well as liquid separated by ordinary filters and it should be understood that filters may be employed instead of centrifuges.

While a particular example of the invention has been described in considerable detail, it should be understood that the invention is not limited thereto since temperatures, cooling rates, number of chilling stages, etc. may be readily determined by those skilled in the art from the foregoing description. A fewer number of chilling vessels may be employed in the first stage with some sacrifice in yield but usually about 4 to 8 or 10 vessels are necessary for best results.

I claim:

1. The method of obtaining 98 to 99 percent pure xylene from a $C_8$ hydrocarbon charge containing about 8 to 25 percent paraxylene in admixture with other $C_8$ xylene isomers, ethyl benzene and paraffins, which method comprises chilling said charge to a temperature below about $-100°$ F. and above the temperature at which a component other than paraxylene would be solidified, separating from the resulting slurry a first solids cake containing about 80 percent solids and a first filtrate, melting the first solids cake and effecting purification thereof in two additional stages of crystallization and separation wherein a second solids cake, containing about 90 to 95 percent solids is obtained by crystallizing at a temperature in the range of about $+20°$ to $-30°$ F. and by separating a second filtrate therefrom in the first of said additional stages and wherein a third solids cake is obtained by crystallizing at a temperature in the range of about $30°$ to $35°$ F. and by separating a third filtrate therefrom in the second of said additional stages, returning at least a part of the filtrate from the second of the additional stages to the first of the additional stages, returning at least a minor part of the filtrate from the first of the additional stages to the initial crystallizing step and melting the cake from the second of the additional stages to obtain a paraxylene of 98 to 99 percent purity.

2. The method of claim 1 which includes the steps of introducing melted first solids cake into the chiller of the first additional stage together with a large amount of filtrate from the first additional stage and a small amount of filtrate from the second additional stage and introducing melted cake from the first additional stage to the second additional stage together with filtrate from the second additional stage.

3. The method of obtaining 98 to 99 percent pure xylene from a $C_8$ hydrocarbon charge containing about 8 to 25 percent paraxylene in admixture with other $C_8$ xylene isomers, ethyl benzene and paraffins, which method comprises chilling said charge to a temperature below about $-100°$ F. and above the temperature at which a component other than paraxylene would be solidified, separating from the resulting slurry a first solids cake containing about 80 percent solids and a first filtrate, melting said first solids cake, combining the melted cake with a melted second cake containing about 90 to 95 percent solids, obtained by separation from a second filtrate, chilling the combined melted cakes in a final chilling zone to a temperature of approximately $30°$ to $35°$ F. to obtain a final slurry, separating said final slurry to obtain a final paraxylene cake and a third filtrate, recycling most of the third filtrate to the final chilling zone, admixing a portion of the third filtrate with most of a second filtrate and chilling the mixture to about $+20°$ to $-30°$ F. to obtain a second slurry, separating the second slurry into said second cake and said second filtrate, melting said second cake for admixture with the melted first cake, returning a minor portion of the second filtrate for admixture with charging stock introduced to the first chilling step, melting the final cake to obtain a paraxylene of about 98 to 99 percent purity and recycling most of the third filtrate to the final chilling zone.

References Cited in the file of this patent

UNITED STATES PATENTS

| 1,940,611 | Strosacker et al. | Dec. 19, 1933 |
| 2,511,711 | Hetzner et al. | June 13, 1950 |
| 2,541,682 | Arnold | Feb. 13, 1951 |
| 2,622,115 | Carney | Dec. 16, 1952 |

FOREIGN PATENTS

| 687,405 | Great Britain | Feb. 11, 1953 |

OTHER REFERENCES

Jour. Am. Chem. Soc., vol. 34, page 978 (1912), article by Richards et al.

Chemical Engineers Handbook, Perry, 3rd edition (1950), McGraw-Hill Book Co., New York, N. Y.